United States Patent
Lee et al.

(10) Patent No.: US 10,832,060 B2
(45) Date of Patent: Nov. 10, 2020

(54) RESIDENT ACTIVITY RECOGNITION SYSTEM AND METHOD THEREOF

(71) Applicant: INDUSTRIAL TECHNOLOGY RESEARCH INSTITUTE, Hsinchu (TW)

(72) Inventors: Jin-Shyan Lee, Kaohsiung (TW); Chun-Hsien Wu, Taichung (TW); Jui-Wen Chen, Taoyuan (TW); Jui-Hsing Huang, Hsinchu (TW); Mao-Jen Chung, Tainan (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 196 days.

(21) Appl. No.: 16/229,929

(22) Filed: Dec. 21, 2018

(65) Prior Publication Data

US 2020/0151461 A1    May 14, 2020

(30) Foreign Application Priority Data

Nov. 14, 2018 (TW) .............................. 107140319 A

(51) Int. Cl.
*G06K 9/00* (2006.01)
*G06N 20/00* (2019.01)
*G07C 9/38* (2020.01)

(52) U.S. Cl.
CPC ..... *G06K 9/00771* (2013.01); *G06K 9/00342* (2013.01); *G06N 20/00* (2019.01); *G07C 9/38* (2020.01)

(58) Field of Classification Search
CPC ......... A61B 2034/2065; B60T 2210/00; B60T 2210/30; B60T 2210/32; G08B 13/19608;
(Continued)

(56) References Cited

U.S. PATENT DOCUMENTS

| 1,463,677 | A | 7/1923 | Davis |
| 8,417,481 | B2 | 4/2013 | Cook et al. |

(Continued)

FOREIGN PATENT DOCUMENTS

| CN | 103279664 A | 9/2013 |
| CN | 104618464 A | 5/2015 |

(Continued)

OTHER PUBLICATIONS

Rong Chen et al., A two-stage method for sovling mutil-residnet activity recognition in smart environments, Entropy, 2014, 16, 2184-2203.

(Continued)

*Primary Examiner* — Duy M Dang
(74) *Attorney, Agent, or Firm* — Locke Lord LLP; Tim Tingkang Xia, Esq.

(57) ABSTRACT

A resident activity recognition method is provided. The method comprises: receiving a plurality of first testing data from a plurality of sensors by a processor, wherein the first testing data includes a present weight set of sensors and present trigger statuses of sensors; determining an activity of a non-target resident at a present time by the processor according to a non-target resident model and the first testing data; reducing a part of the present weight set to generate an updated weight set and a second testing data including the updated weight set and the present trigger statuses by the processor according to the activity of the non-target resident at the present time, the first testing data and the non-target resident model; determining an activity of a target resident at the present time by the processor according to a target resident model and the second testing data.

10 Claims, 3 Drawing Sheets

(58) Field of Classification Search
CPC ............ G08B 13/19606; G08B 13/196; G08G 1/0968; G01C 21/3626; G06K 2209/21; G06K 9/00369; G06K 9/3216; G06K 9/3233; G06K 9/4642; G06K 9/6255; G06K 9/66; G06K 9/00671; G06K 9/00771; G06K 9/00342; G06K 9/62; G06F 16/907; G06F 16/583; G06F 16/58; G06F 16/9537; G06F 16/29; B60R 21/00; G06N 3/02; G06N 3/08; G06N 20/00; G06T 7/00; G07C 9/38

See application file for complete search history.

(56) References Cited

U.S. PATENT DOCUMENTS

| | | | |
|---|---|---|---|
| 9,278,255 | B2 | 3/2016 | Cheng et al. |
| 9,460,350 | B2 | 10/2016 | Cook et al. |
| 9,846,845 | B2 | 12/2017 | Sigal et al. |
| 9,872,088 | B2 | 1/2018 | Fadell et al. |
| 2005/0131581 | A1 | 6/2005 | Sabe et al. |
| 2013/0006899 | A1 | 1/2013 | Cook |
| 2014/0143183 | A1 | 5/2014 | Sigal et al. |
| 2014/0161322 | A1 | 6/2014 | Cheng et al. |
| 2015/0057808 | A1 | 2/2015 | Cook et al. |
| 2017/0172491 | A1 | 6/2017 | Wu et al. |
| 2018/0181720 | A1* | 6/2018 | Ensey ............... G06F 21/6245 |
| 2018/0342081 | A1* | 11/2018 | Kim ............... G06T 7/75 |

FOREIGN PATENT DOCUMENTS

| | | |
|---|---|---|
| CN | 107491735 A | 12/2017 |
| CN | 108428243 A | 8/2018 |
| EP | 3163545 A1 | 5/2017 |
| TW | 201220082 A | 5/2012 |
| TW | 201224842 A | 6/2012 |
| TW | I517074 B | 1/2016 |
| TW | I565339 B | 1/2017 |

OTHER PUBLICATIONS

Hande Alemdar et al., ARAS human activity datasets in multiple homes with multiple residents, 7th International Conference on Pervasive Computing Technologies for Healthcare and Workshops, 2013.

Asma Benmansour et al., Modeling interaction in multi-resident activities, Neurocomputing, 2017, 230, 133-142.

Clifton Phua et al., Multiple people activity recognition using simple sensors, Proceedings of the 1st International Conference on Pervasive and Embedded Computing and Communication Systems, 2011.

Markus Prossegger et al., Mutil-resident activity recognition using incremental decision trees, International Conference on Adaptive and Intelligent Systems, 2014.

Hande Alemdar et al., Multi-resident activity tracking and recognition in smart environments, Journal of Ambient Intelligence and Humanized Computing, 2017, 8, 513-529.

Shu-Yun Chung et al., A Mobile Robot that Understands Pedestrian Spatial Behaviors, IEEE/RSJ International Conference on Intelligent Robots and Systems, 2010.

Han-Pang Huang et al., Generalized Spatial Behavior Cognition Model and Its Applications for Intelligent Robots, IEEE International Conference on Robotics and Automation, 2012.

Taiwan Patent Office, "Office Action", dated Mar. 11, 2019, Taiwan.

* cited by examiner

RESIDENT ACTIVITY RECOGNITION SYSTEM AND METHOD THEREOF

CROSS-REFERENCE TO RELATED APPLICATIONS

This non-provisional application claims priority under 35 U.S.C. § 119(a) on Patent Application No(s). 107140319 filed in the Republic of China on Nov. 14, 2018, the entire contents of which are hereby incorporated by reference.

BACKGROUND

1. Technical Field

This disclosure relates to an activity recognition system and a method thereof, especially for a multi-person activity recognition system and a method thereof

2. Related Art

In response to the advent of an aging society, intelligent home care systems have become the trend of future technology, and human activity recognition (HAR) is one of the important technologies of home care systems. By identifying and recording the elders' home activities, it can be used as a reference for caring for the elders. At present, the activity identification method of the home care system is usually for recognizing the activity of a single person, so the complexity of the sensor data is lower. However, in the actual daily home environment, there are usually many residents living together, and multiple and different activities may occur at the same time, which may increase the complexity of the sensor data to result in a lower accuracy of activity recognition.

Therefore, there is indeed a need for an improved resident activity recognition device and a method thereof, which can overcome the above problems.

SUMMARY

According to one or more embodiments of this disclosure, a resident recognition system is provided and the resident recognition system is adapted to recognize an activity of a target resident and an activity of a non-target resident in a region. The resident activity recognition system comprises a memory device and a processor. The memory device stores a non-target resident model and a target resident model. The processor is electrically connected with the memory device and configured to receive a first testing data. The first testing data comprises a present weight set of a plurality of sensors and present trigger statuses of the plurality of sensors at a present time. The processor determines the activity of the non-target resident at the present time according to the non-target resident model and the first testing data, and generates an updated weight set by reducing a part of the present weight set according to the activity of the non-target resident at the present time, the first testing data and the non-target resident model to produce a second testing data including the updated weight set and the present trigger statuses. And determines the activity of the target resident at the present time according to the target resident model and the second testing data.

According to one or more embodiments of this disclosure, a resident activity recognition method is provided and adapted to recognize an activity of a non-target resident and an activity of a target resident in a region. The method is performed by a resident activity recognition system. The resident activity recognition method comprising: receiving a first testing data sent by a plurality of sensors by a processor and the first testing data including a preset weight set of the sensors and preset trigger statuses of the sensors at a present time; determining the activity of the non-target resident at the present time by the processor according to the non-target resident model and the first testing data; reducing a part of the present weight set to generate an updated weight set and a second testing data including the updated weight set and the present trigger statuses by the processor according to the activity of the non-target resident at the present time, the first testing data and the non-target resident model; and determining the activity of the target resident at the present time by the processor according to the target resident model and the second testing data.

BRIEF DESCRIPTION OF THE DRAWINGS

The present disclosure will become more fully understood from the detailed description given hereinbelow and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
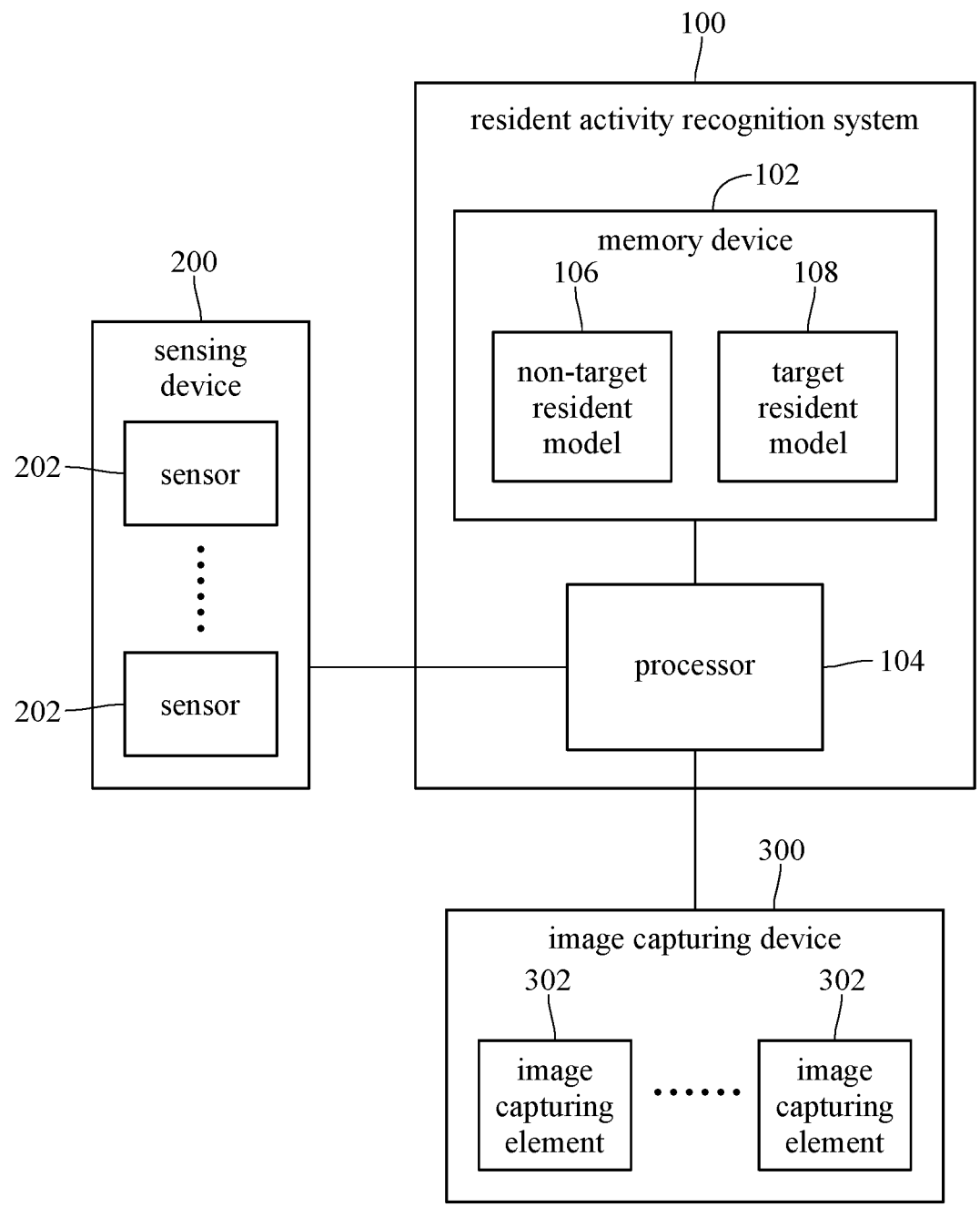
FIG. 1 is a functional block diagram of a resident activity recognition system according to an embodiment of the present disclosure.

Please refer to FIG. 1 which is a functional block diagram of a resident activity recognition system according to an embodiment of the present disclosure. The resident activity recognition system can be configured to identify activities of multiple residents in a region. As shown in FIG. 1, the resident activity recognition system 100 comprises a memory device 102 and a processor 104. For example, the memory device 102 may be a non-volatile memory or a hard disk, and the memory device 102 is electrically connected to the processor 104. The processor 104 can be electrically connected to the sensing device 200 and the image capturing device 300. The sensing device 200 includes a plurality of sensors 202, and the type of each sensor 202 is not limited, for example, each sensor 202 may be an infrared sensor, a temperature sensor, a humidity sensor, a distance sensor or a pressure sensor, and the sensors 202 are respectively disposed at different positions within the region. The image capturing device 300 includes a plurality of image capturing elements 302, and the image capturing elements 302 are respectively disposed at different positions within the region. The resident activity recognition system 100, the sensing device 200, and the image capturing device 300 are respectively provided with communication components, and the sensing device 200 and the image capturing device 300 continuously transmit data to the resident activity recognition system 100 via the communication components.

The sensors 202 generate first testing data at a present time, the first testing data includes a present weight set and present trigger statuses at the present time, wherein the present weight set includes weights of all of the sensors 202 at the present time, and the present trigger statuses include the trigger statuses of all of the sensor 202 at the present time. Training data was generated by the sensors 202 and the image capturing elements 302 during a past period, wherein the past period occurred before the present time. The training data includes a past weight set, past trigger statuses, and activities of target residents during the past period and activities of non-target residents during the past period, wherein the past weight set includes weights of all of the sensors 202 during the past period, and the past trigger statuses include trigger statuses of all of the sensors 202 during the past period. When the processor 104 receives the training data and the first testing data at different time points respectively, the training data and the first testing data are stored in the memory device 102. The image capturing elements 302 were configured to capture activities of all residents in the region during the past period to generate a plurality of various images, and all of the residents in the region are classified into non-target residents and target residents according to the images. In detail, the sensor data includes a trigger status of each of the sensors 202 at a certain time point, the activities of the target residents and the activities of the non-target residents are obtained by identifying the images of the image capturing elements 302 at a certain time point, and the training data is composed of the sensor data, the activities of target residents and the activities of non-target resident. Therefore, the training data not only has the sensor data, but also contains the activities of target residents and activities of non-target residents, thereby training the data to get a target resident model and non-target resident model.

The memory device 102 stores a learning algorithm, and the learning algorithm may include Hidden Markov Model, Decision Tree, Bayesian algorithm, Conditional random field or Support vector machine. The processor 104 can generate the non-target resident model 106 according to the learning algorithm, the activities of the non-target residents, the past weight set and the past trigger statuses, and the processor 104 can generate the target resident model 108 according to the learning algorithm, the activities of the target residents, the past weight set, and the past trigger statuses. The number of the non-target resident may be single or plural. When the number of the non-target resident is plural, the processor 104 generates different non-target resident models 106 for different non-target residents respectively. The number of the target resident may also be single or plural. When the number of the target resident is plural, the processor 104 generates different target resident models 108 for different target residents respectively. The memory device 102 may store the non-target resident model 106 and the target resident model 108 after the processor 104 generates the non-target resident model 106 and the target resident model 108 based on the learning algorithm and the training data.

When the resident activity recognition system 100 is actually used, the non-target resident model 106 and the target resident model 108 are pre-stored in the memory device 102. After the processor 104 of the resident activity recognition system 100 receives the first testing data of the sensors 202, the processor 104 transmits the first testing data to the non-target resident model 106 and then the non-target resident model 106 processes the first testing data. The non-target resident model 106 estimates a plurality of various activities that the non-target resident probably engages in at the present time according to the present weight set and the present trigger status. These activities estimated by the non-target resident model 106 have different occurrence probabilities respectively, and one of these estimated activities with the highest occurrence probability is determined as the activity of the non-target resident at the present time by the processor 104. For example, the non-target resident model 106 may be a first program, the first testing data is an input parameter of the first program, and the activity of the non-target resident at the present time is an output parameter of the first program.

Thereafter, the processor 104 puts the activity of the non-target resident at the present time and the first testing data into the non-target resident model 106, and then the non-target resident model 106 processes the activity of the non-target resident at the present time and the first testing data. The non-target resident model 106 determines which sensors 202 are triggered by the activity of the non-target resident according to the present weight set, the present trigger status and the activity of the non-target resident at the present time.

Then the processor 104 reduces the weight of the sensors 202 which is triggered by the activity of the non-target resident so that a part of the present weight set is adjusted to become an updated weight set, and second testing data comprises the updated weight set and the present trigger statuses, so the content of the second testing data is different from the content of the first testing data.

Finally, the processor 104 puts the second testing data into the target resident model 108 and then the target resident model 108 processes the second testing data. The target resident model 108 estimates a plurality of various activities that the target resident probably engages in at the present time according to the updated weight set and the present trigger statuses. The activities estimated by the target resident model 108 have different occurrence probabilities respectively, and one of these activities with the highest occurrence probability is determined as the activity of the target resident at the present time by the processor 104, and the processor 104 may store the activity of the target resident at the present time to the memory device 102. For example, the target resident model 108 may be a second program, the second testing data is an input parameter of the second program, and the activity of the target resident at the present time is an output parameter of the second program.

In another embodiment, the resident activity recognition system may include the memory device 102, the processor 104, and the sensing device 200. For example, the resident activity recognition system may be a mobile robot that can move within an area continuously.

Figure 2:
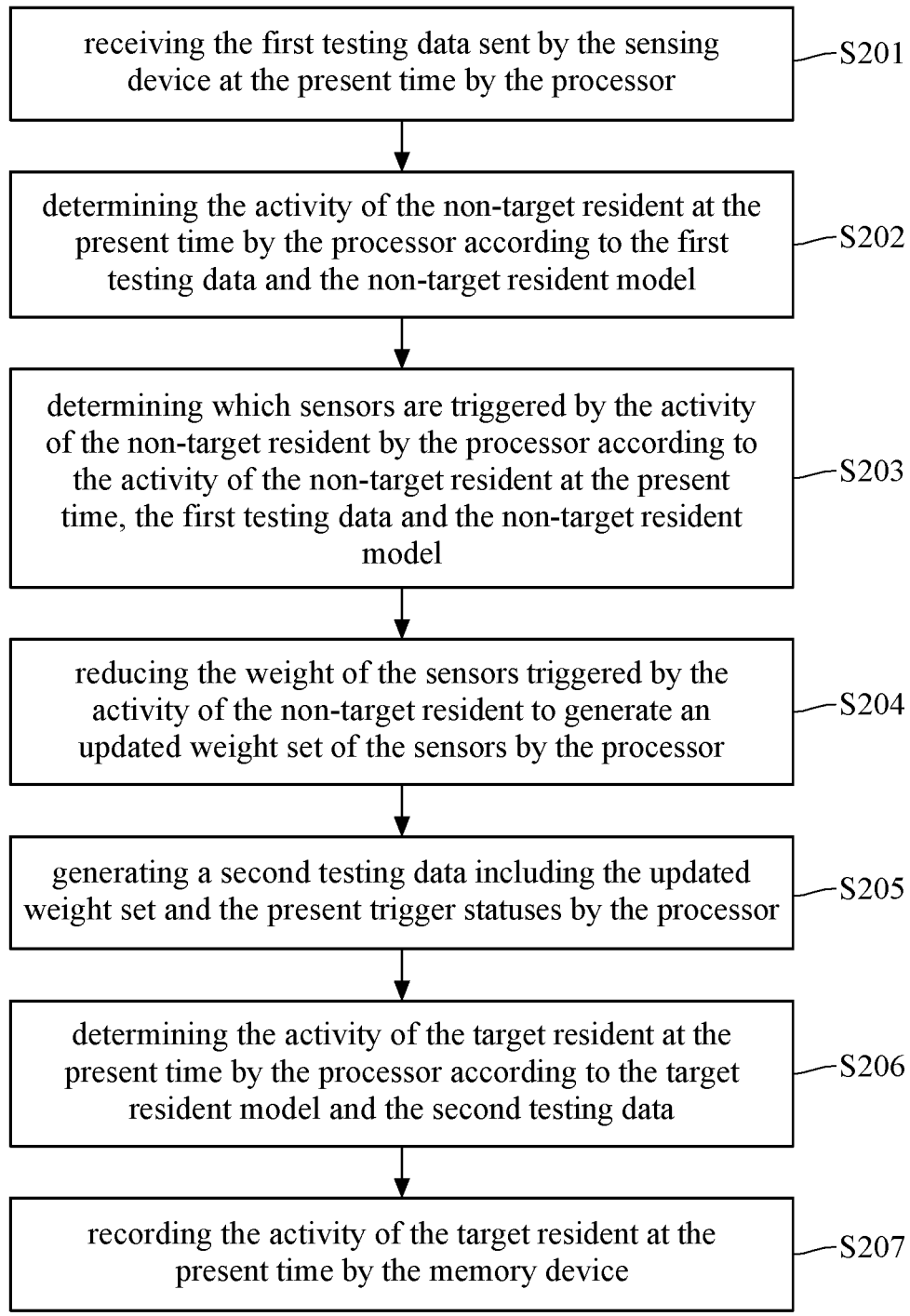
FIG. 2 is a flowchart of a resident activity recognition method according to an embodiment of the present disclosure.

FIG. 2 is a flowchart of a resident recognition method according to an embodiment of the present disclosure. Referring to FIG. 1 and FIG. 2 together, the resident activity recognition method is performed by the resident activity recognition system 100. In Step S201, the system is receiving the first testing data sent by the sensors 202 at the present time by the processor 104, wherein the first testing data includes the present weight set and the present trigger statuses. In detail, the present weight set includes the weights of all of the sensors 202 in a region at the present time, and the present trigger statuses include the trigger statuses of all of the sensors 202 in the region at the present time. In Step S202, the system is determining the activity of the non-target resident at the present time by the processor 104 according to the first testing data and the non-target resident model 106. In detail, after the first testing data put in the non-target resident model 106 by the processor 104, the non-target resident model 106 may estimate a plurality of various activities that the non-target resident probably engages in at the present time and occurrence probabilities of these inferred activities according to the first testing data. And one of the inferred activities with the highest occurrence probability is determined as the activity of the non-target resident at the present time by the processor 104. In Step S203, the system is determining which sensors 202 are triggered by the activity of the non-target resident by the processor 104 according to the activity of the non-target resident at the present time, the first testing data and the non-target resident model 106. In Step S204, the system is reducing the weight of the sensors 202 triggered by the activity of the non-target resident to generate an updated weight set of the sensors 202 by the processor 104, wherein the updated weight set includes at least one first weight and at least one second weight. The value of the first weight is one, the value of the second weight is less than one and greater than zero, and the sensor 202 corresponding to the second weight is triggered by the activity of the non-target resident. In Step S205, the system is generating a second testing data including the updated weight set and the present trigger statuses by the processor 104. In detail, the non-target resident model 106 mainly estimates a relationship between the activity of the non-target resident and the sensors 202, and the first testing data is adjusted according to the activity of the non-target resident. The non-target resident model 106 firstly determines the activity of the non-target resident at the present time and estimates which sensors 202 are most likely triggered by the activity of the non-target resident. Accordingly, the processor 104 reduces a part of the present weight set of the sensors triggered by the activity of the non-target resident in the first testing data so that the adjusted first testing data is approximately as the testing data triggered by the activity of the target resident only, thereby reducing the influence of the activity of the non-target resident on identifying the activity of target resident. In Step S206, the system is determining the activity of the target resident at the present time by the processor 104 according to the target resident model 108 and the second testing data. In detail, the target resident model 108 may estimate a plurality of various activities that the target resident probably engages in at the present time and occurrence probabilities of these inferred activities according to the second testing data, and one of the estimated activities with the highest occurrence probability is determined as the activity of the target resident at the present time by the processor 104. In Step S207, the system is recording the activity of the target resident at the present time by the memory device 102.

Furthermore, in order to decide the reduced amount of the weight value of each sensor, several recognition results generated by different weight candidates are compared with each other for the processor 104 to elect one of the weight candidates as the adjusted weight value, which can generate the highest activity recognition rate among the weight candidates. Regarding the weight candidates, there may be an interval of 0.1 between any adjacent two of the weight candidates while the weight candidates are from 1 to 0.1 for generating the recognition results.

Figure 3:
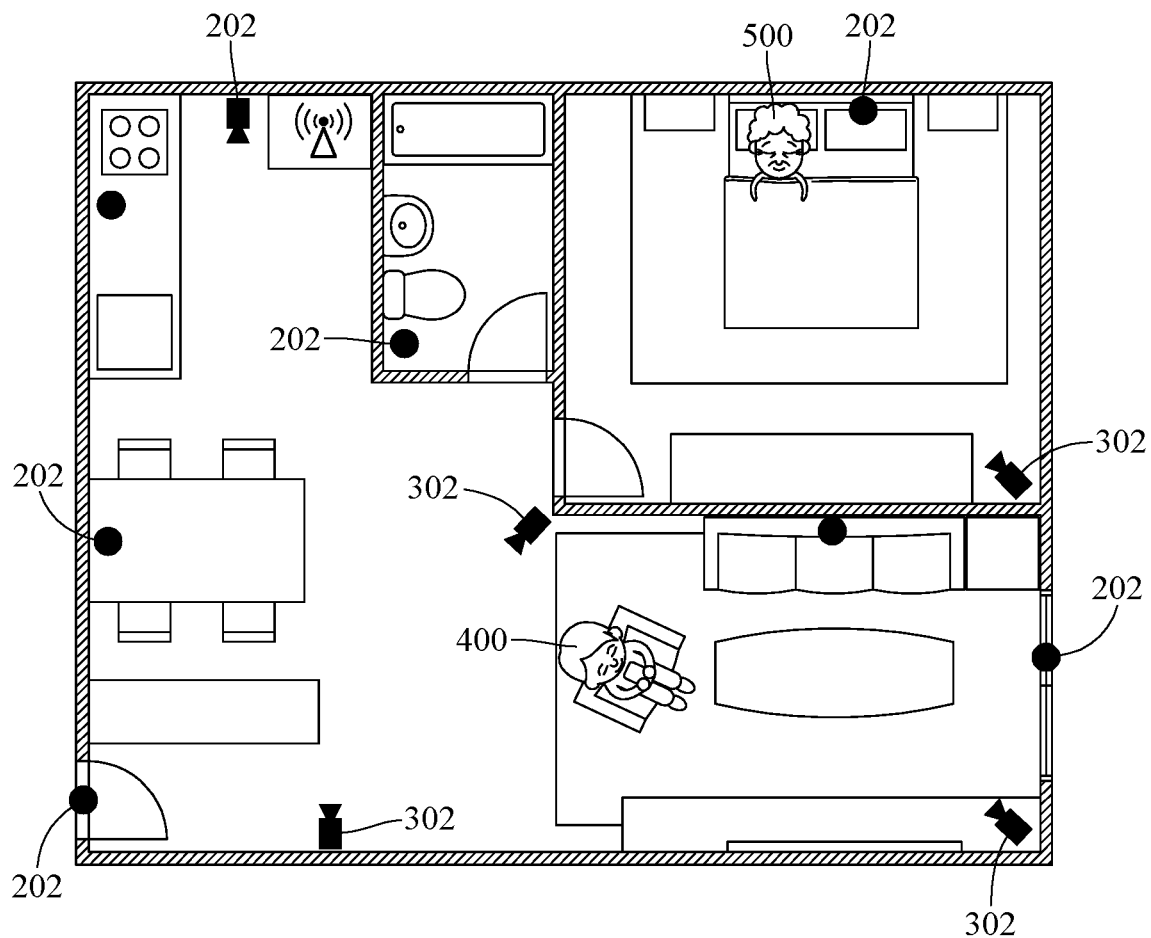
FIG. 3 is a schematic view of usage scenario of a resident activity recognition system according to an embodiment of the present disclosure.

FIG. 3 is a schematic view of usage scenario of a resident recognition system according to an embodiment of the present disclosure. The resident activity recognition system 100 is configured to identify activities of an elder and a young people in the house, wherein the young people is classified as a non-target resident 400, and the elder is classified as a target resident 500. The sensors 202 are respectively mounted at different positions in the house, such as a living room, a sofa, a door, a kitchen, a bathroom, and a bedroom. The processor 104 of the resident activity recognition system 100 firstly receives the testing data sent by the all sensors 202 in the house, and the testing data includes the weights and trigger statuses of all of the sensors 202. Next, the processor 104 determines the activity that the young person most likely engages in according to the testing data and the non-target resident model 106. If the processor 104 determines the young person most likely engages in watching television in the living room, it then determines which sensors 202 is most likely triggered by the young person. Due to the processor 104 determines that the activity that the young person most likely engages in is watching television in the living room, thereby the processor 104 determines the most likely sensor triggered by the young person is located at the sofa in the living room. Next, the processor 104 reduces the weight of the sensor 202 located at the sofa in the living room, thereby updating the testing data. Finally, the processor 104 determines the activity that the elder most likely engages in according to the updated testing data and the target resident model 108, thereby determining that the elder is sleeping in the bedroom. Because the sensors 202 in the house continuously transmit testing data to the resident activity recognition system 100, activities of the elder in different periods in the house can be recorded when the resident activity recognition system 100 is operated for a period, thereby serving as a reference for taking care of the elder.

In view of the above description, the resident activity recognition system can recognize activities of multiple residents at the same time, and the residents do not need to wear sensors and the resident activity recognition system does not need to obtain positioning information of the residents, which is more suitable for the identification of the activities of the residents. Since the weight of the sensor is adjusted by estimating the activity of the non-target resident, the testing data of the sensor can be simulated to be triggered only by the activity of the target resident, which effectively increases the recognition accuracy of the activity of the target resident.

What is claimed is:

1. A resident activity recognition system, adapted to recognize an activity of a target resident and an activity of a non-target resident in a region, and the resident activity recognition system comprising:
   a memory device, storing a non-target resident model and a target resident model; and
   a processor, electrically connected with the memory device and configured to receive a first testing data, the first testing data comprising a present weight set of a plurality of sensors and present trigger statuses of the plurality of sensors at a present time;
   wherein the processor determines the activity of the non-target resident at the present time according to the non-target resident model and the first testing data, generates an updated weight set by reducing a part of the present weight set according to the activity of the non-target resident at the present time, the first testing data and the non-target resident model to produce a second testing data including the updated weight set and the present trigger statuses, and determines the activity of the target resident at the present time according to the target resident model and the second testing data.

2. The resident activity recognition system according to claim 1, further comprising an image capturing device electrically connected to the processor and the memory device, wherein the image capturing device captured the activity of the non-target resident and the activity of the target resident during a past period to produce a plurality of various images, and the past period occurred before the present time.

3. The resident activity recognition system according to claim 2, wherein the sensors generate a training data during the past period, the training data includes a past weight set of the sensors and past trigger statuses of the sensors, and an activity of the target resident and an activity of the non-target resident during the past period, wherein the processor generates the non-target resident model according to a learning algorithm, the past weight set, the past trigger statuses and the activity of the non-target resident during the past period, and wherein the processor generates the target resident model according to the learning algorithm, the past weight set, the past trigger statuses and the activity of the target resident during the past period.

4. The resident activity recognition system according to claim 3, wherein the learning algorithm includes Hidden Markov Model, Decision Tree, Bayesian algorithm, Conditional random field or Support vector machine.

5. The resident activity recognition system according to claim 1, wherein the updated weight set includes a first weight and a second weight, a value of the first weight is one, and a value of the second weight is less than one and greater than zero, and at least one of the sensors corresponding to the second weight is triggered by the non-target resident.

6. A resident activity recognition method, adapted to recognize an activity of a non-target resident and an activity of a target resident in a region and performed by a resident activity recognition system, the resident activity recognition system comprising a memory device and a processor, the memory device storing a non-target resident model and a target resident model, the resident activity recognition method comprising:

receiving a first testing data sent by a plurality of sensors by the processor and the first testing data including a preset weight set of the sensors and preset trigger statuses of the sensors at a present time;

determining the activity of the non-target resident at the present time by the processor according to the non-target resident model and the first testing data;

reducing a part of the present weight set to generate an updated weight set and a second testing data including the updated weight set and the present trigger statuses by the processor according to the activity of the non-target resident at the present time, the first testing data and the non-target resident model; and determining the activity of the target resident at the present time by the processor according to the target resident model and the second testing data.

7. The resident activity recognition method according to claim 6, wherein the updated weight set includes a first weight and a second weight, a value of the first weight is one, and a value of the second weight is less than one and greater than zero, and at least one of the sensors corresponding to the second weight is triggered by the non-target resident.

8. The resident activity recognition method according to claim 6, further comprising capturing an activity of the non-target resident and an activity of the target resident during a past period to produce a plurality of various images by an image capturing device before the first testing data is sent by the sensors.

9. The resident activity recognition method according to claim 6, further comprising generating the non-target resident model and the target resident model by the processor according to a learning algorithm and a training data, wherein the training data includes a past weight set of the sensors and past trigger statuses of the sensors, an activity of the target resident and an activity of the non-target resident during the past period.

10. The resident activity recognition method according to claim 9, wherein the learning algorithm includes Hidden Markov Model, Decision Tree, Bayesian algorithm, Conditional random field or Support vector machine.

* * * * *